(12) United States Patent
Chang et al.

(10) Patent No.: US 9,134,505 B2
(45) Date of Patent: Sep. 15, 2015

(54) IMAGING LENS, AND ELECTRONIC APPARATUS INCLUDING THE SAME

(71) Applicant: Genius Electronic Optical Co., Ltd., Taichung (TW)

(72) Inventors: Kuo-Wen Chang, Taichung (TW); Sheng-Wei Hsu, Taichung (TW); Chih-Yamg Yeh, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 42 days.

(21) Appl. No.: 14/068,539

(22) Filed: Oct. 31, 2013

(65) Prior Publication Data

US 2015/0002722 A1     Jan. 1, 2015

(30) Foreign Application Priority Data

Jun. 28, 2013   (TW) .............................. 102123286 A

(51) Int. Cl.
*G02B 9/60* (2006.01)
*G02B 13/00* (2006.01)

(52) U.S. Cl.
CPC .............. *G02B 9/60* (2013.01); *G02B 13/0045* (2013.01)

(58) Field of Classification Search
USPC ........................................................ 359/763
See application file for complete search history.

(56) References Cited

U.S. PATENT DOCUMENTS

| 8,179,615 | B1 | 5/2012 | Tang et al. |
| 8,305,697 | B1 | 11/2012 | Chen et al. |
| 8,339,718 | B1 | 12/2012 | Tang et al. |
| 2010/0253829 | A1 | 10/2010 | Shinohara |
| 2010/0254029 | A1 | 10/2010 | Shinohara |
| 2012/0087020 | A1 | 4/2012 | Tang et al. |
| 2012/0127359 | A1 | 5/2012 | Chen et al. |
| 2012/0154929 | A1* | 6/2012 | Tsai et al. ..................... 359/714 |
| 2012/0162769 | A1 | 6/2012 | Suzuki et al. |
| 2013/0021679 | A1 | 1/2013 | Tsai et al. |
| 2013/0033765 | A1 | 2/2013 | Tsai et al. |
| 2013/0050848 | A1 | 2/2013 | Lee |
| 2013/0100542 | A1 | 4/2013 | Tsai et al. |

FOREIGN PATENT DOCUMENTS

| CN | 102540423 A | 7/2012 |
| CN | 202661703 U | 1/2013 |
| JP | S6419315 A | 1/1989 |
| JP | H07120677 A | 5/1995 |
| JP | 2010026434 A | 2/2010 |
| JP | 2010256608 A | 11/2010 |
| JP | 2012037763 A | 2/2012 |
| TW | 201224506 A1 | 6/2012 |

(Continued)

*Primary Examiner* — James Jones
(74) *Attorney, Agent, or Firm* — Baker & McKenzie LLP

(57) ABSTRACT

An imaging lens includes first to fifth lens elements arranged from an object side to an image side in the given order. The image-side surface of the first lens element has a convex portion in a vicinity of its periphery. The object-side surface of the second lens element has a concave portion in a vicinity of its periphery. The image-side surface of the second lens element has a convex portion in a vicinity of its periphery. The object-side surface of the third lens element has a concave portion in a vicinity of its periphery. The fourth lens element has a positive refractive power, and the object-side surface thereof has a concave portion in a vicinity of an optical axis. The fifth lens element is made of a plastic material.

11 Claims, 24 Drawing Sheets

(56) References Cited

FOREIGN PATENT DOCUMENTS

| TW | 201239444 | A1 | 10/2012 |
| TW | 201245758 | A1 | 11/2012 |
| TW | 201248187 | A1 | 12/2012 |
| TW | 201250284 | A1 | 12/2012 |
| TW | 201317618 | A | 5/2013 |

* cited by examiner system focal length =2.66mm, half field-of-view =42.73°, F-number =2.45, system length =3.97mm

| lens element | surface | radius of curvature | thickness | refractive index | Abbe number | material | focal length |
|---|---|---|---|---|---|---|---|
| object | | ∞ | 1200.000 | | | | |
| aperture stop 2 | | ∞ | -0.049 | | | | |
| first lens element 3 | object-side surface 31 | 2.097 | 0.427 | 1.546 | 56.114 | plastic | 3.398 |
| | image-side surface 32 | -14.905 | 0.053 | | | | |
| second lens element 4 | object-side surface 41 | -5.649 | 0.352 | 1.546 | 56.114 | plastic | 10.837 |
| | image-side surface 42 | -2.953 | 0.064 | | | | |
| third lens element 5 | object-side surface 51 | 15.385 | 0.240 | 1.645 | 23.528 | plastic | -5.099 |
| | image-side surface 52 | 2.691 | 0.395 | | | | |
| fourth lens element 6 | object-side surface 61 | -1.524 | 0.611 | 1.546 | 56.114 | plastic | 1.676 |
| | image-side surface 62 | -0.653 | 0.050 | | | | |
| fifth lens element 7 | object-side surface 71 | 2.335 | 0.521 | 1.546 | 56.114 | plastic | -2.068 |
| | image-side surface 72 | 0.701 | 0.600 | | | | |
| optical filter 8 | object-side surface 81 | ∞ | 0.210 | | | | |
| | image-side surface 82 | ∞ | 0.445 | | | | |
| image plane 9 | | | 0.004 | | | | |

FIG.3

| surface | 31 | 32 | 41 | 42 | 51 | 52 | 61 | 62 | 71 | 72 |
|---|---|---|---|---|---|---|---|---|---|---|
| K | -8.768E+00 | 0.000E+00 | 0.000E+00 | -3.452E+01 | 0.000E+00 | 0.000E+00 | 0.000E+00 | -1.000E+00 | 0.000E+00 | -5.226E+00 |
| $a_4$ | 2.381E-02 | 2.446E-02 | 2.445E-01 | -2.822E-01 | -6.759E-01 | -3.732E-01 | 1.706E-01 | 5.760E-01 | -1.765E-01 | -6.687E-02 |
| $a_6$ | 3.189E-01 | -1.112E+00 | -1.221E+00 | 6.393E-02 | 3.089E-02 | 1.431E-01 | 8.691E-03 | -1.531E-03 | 7.487E-02 | 1.757E-02 |
| $a_8$ | -3.619E+00 | --- | --- | -4.981E-01 | -1.636E-01 | 1.203E-01 | -2.751E-02 | 3.604E-02 | -6.935E-02 | -5.613E-03 |
| $a_{10}$ | 1.116E+01 | --- | --- | 8.545E-01 | 6.105E-01 | -3.913E-01 | 4.787E-02 | -5.775E+00 | 5.028E-02 | 1.191E-03 |
| $a_{12}$ | -1.432E+01 | --- | --- | -8.100E-01 | -4.702E-02 | 2.478E-01 | -2.546E-02 | 5.714E+00 | -1.924E-02 | -1.105E-04 |
| $a_{14}$ | --- | --- | --- | --- | --- | --- | -9.985E-03 | -2.928E+00 | 3.865E-03 | --- |
| $a_{16}$ | --- | --- | --- | --- | --- | --- | --- | 5.892E-01 | -3.817E-04 | --- |
| $a_{18}$ | --- | --- | --- | --- | --- | --- | --- | --- | 1.359E-05 | --- |

FIG.4 system focal length =2.50mm, half field-of-view =44.86°, F-number =2.45, system length =3.84mm

| lens element | surface | radius of curvature | thickness | refractive index | Abbe number | material | focal length |
|---|---|---|---|---|---|---|---|
| object | | ∞ | 1200.000 | | | | |
| aperture stop 2 | | ∞ | -0.047 | | | | |
| first lens element 3 | object-side surface 31 | 2.005 | 0.361 | 1.546 | 56.114 | plastic | 3.628 |
| | image-side surface 32 | -150.000 | 0.160 | | | | |
| second lens element 4 | object-side surface 41 | -24.591 | 0.388 | 1.546 | 56.114 | plastic | 7.183 |
| | image-side surface 42 | -3.401 | 0.160 | | | | |
| third lens element 5 | object-side surface 51 | -8.022 | 0.321 | 1.645 | 23.528 | plastic | -3.404 |
| | image-side surface 52 | 3.067 | 0.233 | | | | |
| fourth lens element 6 | object-side surface 61 | -2.639 | 0.620 | 1.546 | 56.114 | plastic | 1.403 |
| | image-side surface 62 | -0.643 | 0.160 | | | | |
| fifth lens element 7 | object-side surface 71 | 4.850 | 0.529 | 1.546 | 56.114 | plastic | -1.598 |
| | image-side surface 72 | 0.711 | 0.600 | | | | |
| optical filter 8 | object-side surface 81 | ∞ | 0.210 | | | | |
| | image-side surface 82 | ∞ | 0.081 | | | | |
| image plane 9 | | ∞ | 0.019 | | | | |

FIG.7

| surface | 31 | 32 | 41 | 42 | 51 | 52 | 61 | 62 | 71 | 72 |
|---|---|---|---|---|---|---|---|---|---|---|
| K | -8.768E+00 | 0.000E+00 | 0.000E+00 | -3.452E+01 | 0.000E+00 | 0.000E+00 | 0.000E+00 | -1.000E+00 | 0.000E+00 | -5.226E+00 |
| $a_4$ | -6.861E-04 | -1.761E-01 | -4.251E-02 | -2.961E-01 | -6.701E-01 | -3.666E-01 | 3.478E-02 | 5.344E-01 | -1.249E-01 | -5.920E-02 |
| $a_6$ | 3.273E-01 | -4.602E-01 | -4.316E-01 | 1.107E-01 | 3.787E-02 | 1.378E-01 | -1.543E-02 | -1.523E+00 | 7.616E-02 | 1.870E-02 |
| $a_8$ | -4.134E+00 | --- | --- | -6.916E-01 | -1.701E-01 | 1.564E-01 | -3.518E-02 | 3.586E+00 | -7.298E-02 | -4.444E-03 |
| $a_{10}$ | 1.195E+01 | --- | --- | 6.266E-01 | 5.485E-01 | -3.863E-01 | 3.246E-02 | -5.786E+00 | 5.043E-02 | 5.883E-04 |
| $a_{12}$ | -1.432E+01 | --- | --- | -4.368E-01 | -2.603E-02 | 2.126E-01 | -2.885E-02 | 5.712E+00 | -1.916E-02 | -4.327E-05 |
| $a_{14}$ | --- | --- | --- | --- | --- | --- | 8.084E-04 | -2.925E+00 | 3.912E-03 | --- |
| $a_{16}$ | --- | --- | --- | --- | --- | --- | --- | 5.918E-01 | -3.994E-04 | --- |
| $a_{18}$ | --- | --- | --- | --- | --- | --- | --- | --- | 1.578E-05 | --- |

FIG.8

| system focal length =2.85mm, half field-of-view =40.74°, F-number =2.45, system length =4.16mm ||||||||
|---|---|---|---|---|---|---|---|
| lens element | surface | radius of curvature | thickness | refractive index | Abbe number | material | focal length |
| object | | ∞ | 1200.000 | | | | |
| aperture stop 2 | | ∞ | -0.043 | | | | |
| first lens element 3 | object-side surface 31 | 2.161 | 0.373 | 1.546 | 56.114 | plastic | 3.905 |
| | image-side surface 32 | -150.000 | 0.100 | | | | |
| second lens element 4 | object-side surface 41 | -6.566 | 0.335 | 1.546 | 56.114 | plastic | 7.971 |
| | image-side surface 42 | -2.664 | 0.100 | | | | |
| third lens element 5 | object-side surface 51 | 150.000 | 0.306 | 1.645 | 23.528 | plastic | -4.841 |
| | image-side surface 52 | 3.054 | 0.355 | | | | |
| fourth lens element 6 | object-side surface 61 | -1.422 | 0.630 | 1.546 | 56.114 | plastic | 1.676 |
| | image-side surface 62 | -0.644 | 0.112 | | | | |
| fifth lens element 7 | object-side surface 71 | 2.343 | 0.450 | 1.546 | 56.114 | plastic | -2.086 |
| | image-side surface 72 | 0.714 | 0.600 | | | | |
| optical filter 8 | object-side surface 81 | ∞ | 0.210 | | | | |
| | image-side surface 82 | ∞ | 0.585 | | | | |
| image plane 9 | | ∞ | 0.006 | | | | |

FIG.11

| surface | 31 | 32 | 41 | 42 | 51 | 52 | 61 | 62 | 71 | 72 |
|---|---|---|---|---|---|---|---|---|---|---|
| K | -8.768E+00 | 0.000E+00 | 0.000E+00 | -3.452E+01 | 0.000E+00 | 0.000E+00 | 0.000E+00 | -1.000E+00 | 0.000E+00 | -5.226E+00 |
| $a_4$ | 1.546E-02 | 3.592E-04 | 2.566E-01 | -2.824E-01 | -6.668E-01 | -3.735E-01 | 1.672E-01 | 5.724E-01 | -1.802E-01 | -7.906E-02 |
| $a_6$ | 2.386E-01 | -9.931E-01 | -1.120E+00 | 3.383E-02 | 2.330E-02 | 1.471E-01 | 1.046E-02 | -1.532E+00 | 7.383E-02 | 2.165E-02 |
| $a_8$ | -3.765E+00 | --- | --- | -5.288E-01 | -1.595E-01 | 1.197E-01 | -2.139E-02 | 3.604E+00 | -6.916E-02 | -5.907E-03 |
| $a_{10}$ | 1.135E+01 | --- | --- | 8.659E-01 | 6.286E-01 | -3.929E-01 | 5.426E-02 | -5.776E+00 | 5.029E-02 | 1.203E-03 |
| $a_{12}$ | -1.432E+01 | --- | --- | -8.237E-01 | -3.327E-03 | 2.531E-01 | -2.117E-02 | 5.713E+00 | -1.926E-02 | -1.253E-04 |
| $a_{14}$ | --- | --- | --- | --- | --- | --- | -9.708E-03 | -2.928E-01 | 3.853E-03 | --- |
| $a_{16}$ | --- | --- | --- | --- | --- | --- | --- | 5.892E-01 | -3.838E-04 | --- |
| $a_{18}$ | --- | --- | --- | --- | --- | --- | --- | --- | 1.450E-05 | --- |

FIG.12

FIG.15 system focal length =2.60mm, half field-of-view =43.28°, F-number =2.45, system length =3.97mm

| lens element | surface | radius of curvature | thickness | refractive index | Abbe number | material | focal length |
|---|---|---|---|---|---|---|---|
| object | | ∞ | 1200.000 | | | | |
| aperture stop 2 | | ∞ | -0.044 | | | | |
| first lens element 3 | object-side surface 31 | 2.121 | 0.355 | 1.546 | 56.114 | plastic | 4.038 |
| | image-side surface 32 | 52.716 | 0.100 | | | | |
| second lens element 4 | object-side surface 41 | -7.934 | 0.350 | 1.546 | 56.114 | plastic | 7.084 |
| | image-side surface 42 | -2.640 | 0.100 | | | | |
| third lens element 5 | object-side surface 51 | 26.081 | 0.299 | 1.645 | 23.528 | plastic | -4.721 |
| | image-side surface 52 | 2.713 | 0.350 | | | | |
| fourth lens element 6 | object-side surface 61 | -1.576 | 0.621 | 1.546 | 56.114 | plastic | 1.601 |
| | image-side surface 62 | -0.641 | 0.100 | | | | |
| fifth lens element 7 | object-side surface 71 | 2.525 | 0.517 | 1.546 | 56.114 | plastic | -1.967 |
| | image-side surface 72 | 0.699 | 0.600 | | | | |
| optical filter 8 | object-side surface 81 | ∞ | 0.210 | | | | |
| | image-side surface 82 | ∞ | 0.351 | | | | |
| image plane 9 | | ∞ | 0.012 | | | | |

| surface | 31 | 32 | 41 | 42 | 51 | 52 | 61 | 62 | 71 | 72 |
|---|---|---|---|---|---|---|---|---|---|---|
| K | -8.768E+00 | 0.000E+00 | 0.000E+00 | -3.452E+01 | 0.000E+00 | 0.000E+00 | 0.000E+00 | -1.000E+00 | 0.000E+00 | -5.226E+00 |
| $a_4$ | 2.227E-02 | 4.130E-03 | 2.361E-01 | -2.783E-01 | -6.626E-01 | -3.780E-01 | 1.705E-01 | 5.652E-01 | -1.684E-01 | -6.815E-02 |
| $a_6$ | 2.452E-01 | -1.040E+00 | -1.131E+00 | 5.075E-02 | 2.311E-02 | 1.512E-01 | 3.643E-03 | -1.532E-01 | 7.047E-02 | 1.908E-02 |
| $a_8$ | -3.811E+00 | --- | --- | -5.256E-01 | -1.602E-01 | 1.261E-01 | -2.784E-02 | 3.604E-02 | -6.983E-02 | -6.292E-03 |
| $a_{10}$ | 1.128E+01 | --- | --- | 8.750E-01 | 6.448E-01 | -3.924E-01 | 5.007E-02 | -5.775E-02 | 5.028E-02 | 1.371E-03 |
| $a_{12}$ | -1.432E+01 | --- | --- | -7.952E-01 | -2.320E-02 | 2.402E-01 | -2.167E-02 | 5.714E-02 | -1.923E-02 | -1.387E-04 |
| $a_{14}$ | --- | --- | --- | --- | --- | --- | -5.695E-03 | -2.928E-03 | 3.871E-03 | --- |
| $a_{16}$ | --- | --- | --- | --- | --- | --- | --- | 5.890E-01 | -3.826E-04 | --- |
| $a_{18}$ | --- | --- | --- | --- | --- | --- | --- | --- | 1.224E-05 | --- |

FIG.16 system focal length =2.95mm, half field-of-view =39.67°, F-number =2.45, system length =4.28mm

| lens element | surface | radius of curvature | thickness | refractive index | Abbe number | material | focal length |
|---|---|---|---|---|---|---|---|
| object | | ∞ | 1200.000 | | | | |
| aperture stop 2 | | ∞ | -0.040 | | | | |
| first lens element 3 | object-side surface 31 | 2.200 | 0.436 | 1.546 | 56.114 | plastic | 3.303 |
| | image-side surface 32 | -9.296 | 0.100 | | | | |
| second lens element 4 | object-side surface 41 | -4.379 | 0.309 | 1.546 | 56.114 | plastic | 11.608 |
| | image-side surface 42 | -2.654 | 0.116 | | | | |
| third lens element 5 | object-side surface 51 | -5.753 | 0.324 | 1.645 | 23.528 | plastic | -4.177 |
| | image-side surface 52 | 5.172 | 0.270 | | | | |
| fourth lens element 6 | object-side surface 61 | -1.483 | 0.639 | 1.546 | 56.114 | plastic | 1.681 |
| | image-side surface 62 | -0.653 | 0.125 | | | | |
| fifth lens element 7 | object-side surface 71 | 2.345 | 0.426 | 1.546 | 56.114 | plastic | -2.152 |
| | image-side surface 72 | 0.732 | 0.600 | | | | |
| optical filter 8 | object-side surface 81 | ∞ | 0.210 | | | | |
| | image-side surface 82 | ∞ | 0.709 | | | | |
| image plane 9 | | | 0.012 | | | | |

FIG.19

| surface | 31 | 32 | 41 | 42 | 51 | 52 | 61 | 62 | 71 | 72 |
|---|---|---|---|---|---|---|---|---|---|---|
| K | -8.768E+00 | 0.000E+00 | 0.000E+00 | -3.452E+01 | 0.000E+00 | 0.000E+00 | 0.000E+00 | -1.000E+00 | 0.000E+00 | -5.226E+00 |
| $a_4$ | 7.608E-03 | -5.949E-02 | 1.950E-01 | -2.606E-01 | -6.431E-01 | -3.564E-01 | 1.395E-01 | 5.550E-01 | -1.903E-01 | -8.426E-02 |
| $a_6$ | 2.905E-01 | -8.169E-01 | -1.035E+00 | -1.897E-02 | -2.344E-02 | 1.640E-01 | -1.454E-02 | -1.532E+00 | 6.761E-02 | 2.036E-02 |
| $a_8$ | -3.616E+00 | --- | --- | -6.585E-01 | -1.623E-01 | 1.097E-01 | -2.267E-02 | 3.604E+00 | -6.639E-02 | -5.168E-03 |
| $a_{10}$ | 1.107E+01 | --- | --- | 9.067E-01 | 6.585E-01 | -4.021E-01 | 6.390E-02 | -5.779E+00 | 5.074E-02 | 1.273E-03 |
| $a_{12}$ | -1.432E+01 | --- | --- | -6.834E-01 | 7.326E-02 | 2.652E-01 | -1.524E-02 | 5.711E+00 | -1.942E-02 | -1.821E-04 |
| $a_{14}$ | --- | --- | --- | --- | --- | --- | -1.407E-02 | -2.928E+00 | 3.766E-03 | --- |
| $a_{16}$ | --- | --- | --- | --- | --- | --- | --- | 5.906E-01 | -4.098E-04 | --- |
| $a_{18}$ | --- | --- | --- | --- | --- | --- | --- | --- | 1.062E-05 | --- |

FIG.20

| relationship | first preferred embodiment | second preferred embodiment | third preferred embodiment | fourth preferred embodiment | fifth preferred embodiment |
|---|---|---|---|---|---|
| T2 | 0.35 | 0.39 | 0.33 | 0.35 | 0.31 |
| T5 | 0.52 | 0.53 | 0.45 | 0.52 | 0.43 |
| G34 | 0.40 | 0.23 | 0.36 | 0.35 | 0.27 |
| CTmin | 0.24 | 0.32 | 0.31 | 0.30 | 0.31 |
| Gaa | 0.56 | 0.71 | 0.67 | 0.65 | 0.61 |
| ALT | 2.15 | 2.22 | 2.09 | 2.14 | 2.13 |
| EFL | 2.66 | 2.50 | 2.85 | 2.60 | 2.95 |
| Gaa/G34 | 1.42 | 3.06 | 1.88 | 1.86 | 2.26 |
| EFL/T2 | 7.56 | 6.44 | 8.52 | 7.43 | 9.56 |
| EFL/G34 | 6.73 | 10.71 | 8.03 | 7.43 | 10.93 |
| Gaa/T5 | 1.08 | 1.35 | 1.48 | 1.26 | 1.43 |
| Gaa/CTmin | 2.34 | 2.22 | 2.18 | 2.17 | 1.98 |
| ALT/Gaa | 3.83 | 3.11 | 3.14 | 3.30 | 3.49 |
| Gaa/T2 | 1.60 | 1.84 | 1.99 | 1.86 | 1.98 |

FIG.22

IMAGING LENS, AND ELECTRONIC APPARATUS INCLUDING THE SAME

CROSS-REFERENCE TO RELATED APPLICATION

This application claims priority to Taiwanese Application No. 102123286, filed on Jun. 28, 2013.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Each of U.S. patent application publication nos. 20120154929, 20100253829, and 20100254029, U.S. Pat. Nos. 8,305,697 and 8,339,718, and Japanese patent publication nos. 2010-026434 and 2010-256608 discloses a conventional imaging lens with five lens elements, and a sum of distances between adjacent pairs of the lens elements is large.

U.S. patent application publication no. 20100254029 discloses the imaging lens having a system length of over 10 mm, which goes against the trend toward reducing dimensions of portable electronic products, such as mobile phones and digital cameras.

Reducing the system length of the imaging lens while maintaining sufficient optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens comprises first, second, third, fourth and fifth lens elements arranged from an object side to an image side in the given order along an optical axis of the imaging lens. Each of the first, second, third, fourth and fifth lens elements has an object-side surface facing toward the object side and an image-side surface facing toward the image side.

The image-side surface of the first lens element has a convex portion in a vicinity of a periphery of the first lens element.

The object-side surface of the second lens element has a concave portion in a vicinity of a periphery of the second lens element. The image-side surface of the second lens element has a convex portion in a vicinity of the periphery of the second lens element.

The object-side surface of the third lens element has a concave portion in a vicinity of a periphery of the third lens element.

The fourth lens element has a positive refractive power. The object-side surface of the fourth lens element has a concave portion in a vicinity of the optical axis.

The fifth lens element is made of a plastic material.

Another object of the present invention is to provide an electronic apparatus having an imaging lens with five lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 22 is a table that lists values of parameters of other optical relationships corresponding to the imaging lenses of the first to fifth preferred embodiments;

DETAILED DESCRIPTION OF THE PREFERRED EMBODIMENTS

Figure 1:
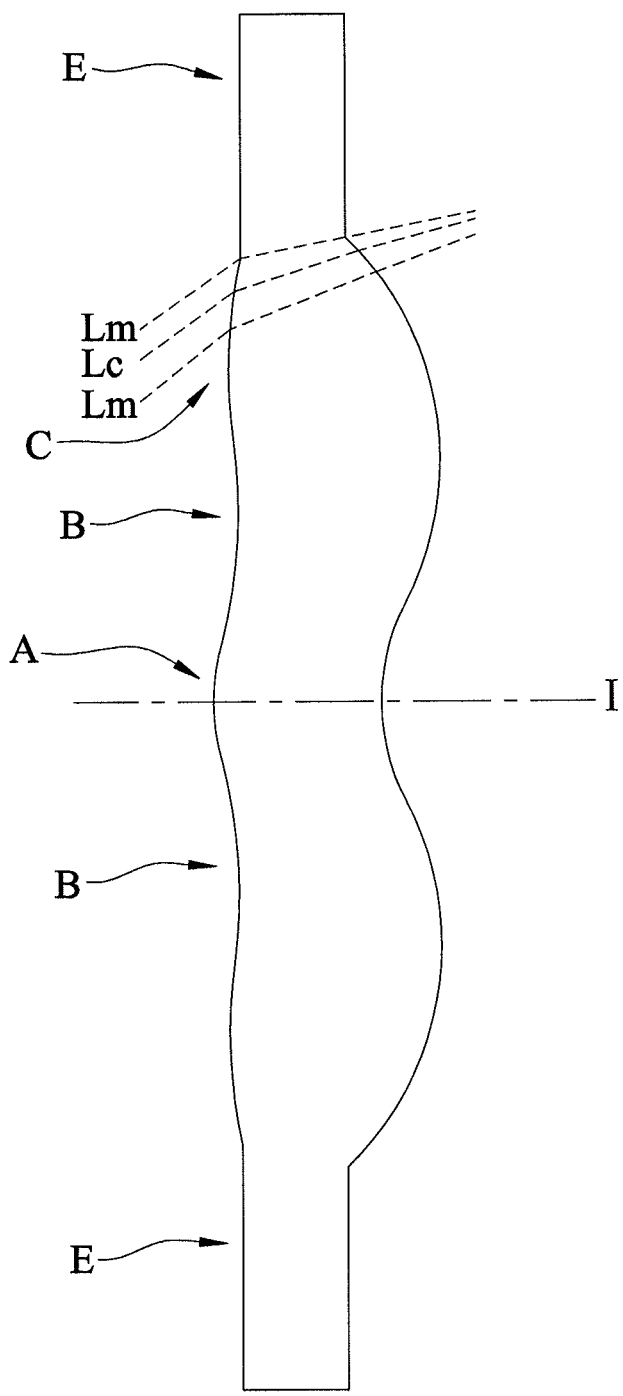
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
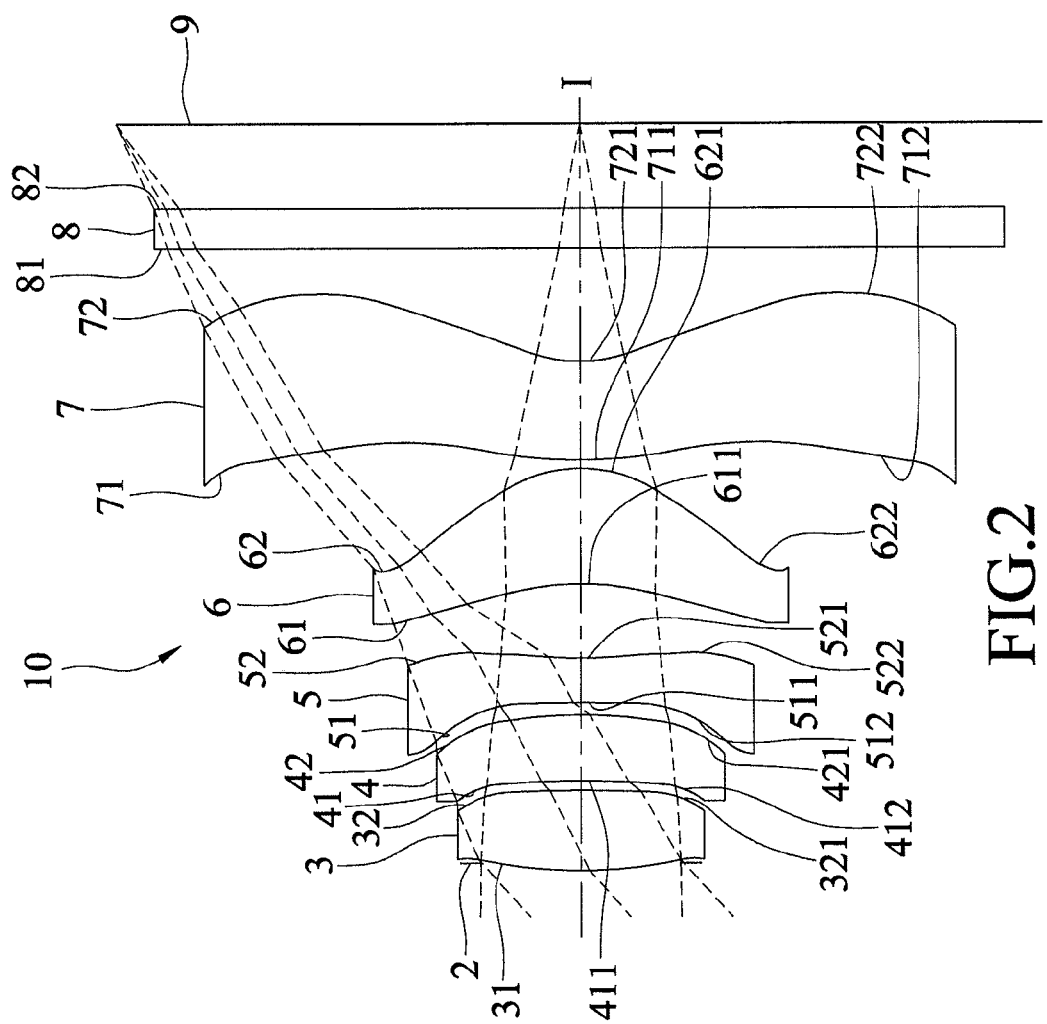
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, first, second, third, fourth and fifth lens elements 3-7, and an optical filter 8 arranged in the given order along an optical axis (I) from an object side to an image side. The optical filter 8 is an infrared cut filter for selectively absorbing infrared light to thereby reduce imperfection of images formed at an image plane 9.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 9. Each of the object-side surfaces 31, 41, 51, 61, 71 and the image-side surfaces 32, 42, 52, 62, 72 is aspherical and has a center point coinciding with the optical axis (I).

The lens elements 3-7 are made of a plastic material in this embodiment, and at least one of the lens elements 3-6 may be made of other materials in other embodiments.

In the first preferred embodiment, which is depicted in FIG. 2, the first lens element 3 has a positive refractive power. The object-side surface 31 of the first lens element 3 is a convex surface, and the image-side surface 32 of the first lens element 3 is a convex surface that has a convex portion 321 in a vicinity of a periphery of the first lens element 3.

The second lens element 4 has a positive refractive power. The object-side surface 41 of the second lens element 4 is a concave surface that has a concave portion 411 in a vicinity of the optical axis (I), and a concave portion 412 in a vicinity of a periphery of the second lens element 4. The image-side surface 42 of the second lens element 4 is a convex surface that has a convex portion 421 in a vicinity of the periphery of the second lens element 4.

The third lens element 5 has a negative refractive power. The object-side surface 51 of the third lens element 5 has a convex portion 511 in a vicinity of the optical axis (I), and a concave portion 512 in a vicinity of a periphery of the third lens element 5. The image-side surface 52 of the third lens element 5 has a concave portion 521 in a vicinity of the optical axis (I), and a convex portion 522 in a vicinity of the periphery of the third lens element 5.

The fourth lens element 6 has a positive refractive power. The object-side surface 61 of the fourth lens element 6 is a concave surface that has a concave portion 611 in a vicinity of the optical axis (I). The image-side surface 62 of the fourth lens element 6 has a convex portion 621 in a vicinity of the optical axis (I), and a concave portion 622 in a vicinity of a periphery of the fourth lens element 6.

The fifth lens element 7 has a negative refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

Shown in FIG. 3 is a table that lists values of some optical parameters corresponding to the surfaces 31-81, 32-82 of the first preferred embodiment. The imaging lens 10 has an overall system effective focal length (EFL) of 2.66 mm, a half field-of-view (HFOV) of 42.73°, an F-number of 2.45, and a system length of 3.97 mm. The system length refers to a distance between the object-side surface 31 of the first lens element 3 and the image plane 9 at the optical axis (I).

In this embodiment, each of the object-side surfaces 31-71 and the image-side surfaces 32-72 is aspherical, and satisfies the optical relationship of $$Z(Y) = \frac{Y^2}{R} / \left(1 + \sqrt{1 - (1+K)\frac{Y^2}{R^2}}\right) + \sum_{i=1}^{n} a_{2i} \times Y^{2i} \quad (1)$$

where:

R represents a radius of curvature of the aspherical surface;

Z represents a depth of an aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_{2i}$ represents a $2i^{th}$ aspherical coefficient.

Shown in FIG. 4 is a table that lists values of some optical parameters of the aforementioned optical relationship (1) corresponding to the first preferred embodiment.

Relationships among some of the aforementioned optical parameters corresponding to the first preferred embodiment are as follows:

$Gaa/G34=1.42$ $EFL/T2=7.56$ $EFL/G34=6.73$ $Gaa/T5=1.08$ $Gaa/CTmin=2.34$ $ALT/Gaa=3.83$ $Gaa/T2=1.60$ where:

T2 represents a distance between the object-side surface 41 and the image-side surface 42 of the second lens element 4 at the optical axis (I);

T5 represents a distance between the object-side surface 71 and the image-side surface 72 of the fifth lens element 7 at the optical axis (I);

ALT represents a sum of a distance between the object-side surface 31 and the image-side surface 32 of the first lens element 3 at the optical axis (I), the distance between the object-side surface 41 and the image-side surface 42 of the second lens element 4 at the optical axis (I), a distance between the object-side surface 51 and the image-side surface 52 of the third lens element 5 at the optical axis (I), a distance between the object-side surface 61 and the image-side surface 62 of the fourth lens element 6 at the optical axis (I), and the distance between the object-side surface 71 and the image-side surface 72 of the fifth lens element 7 at the optical axis (I);

Gaa represents a sum of a distance between the image-side surface 32 of the first lens element 3 and the object-side surface 41 of the second lens element 4 at the optical axis (I), a distance between the image-side surface 42 of the second lens element 4 and the object-side surface 51 of the third lens element 5 at the optical axis (I), a distance between the image-side surface 52 of the third lens element 5 and the object-side surface 61 of the fourth lens element 6 at the optical axis (I), and a distance between the image-side surface 62 of the fourth lens element 6 and the object-side surface 71 of the fifth lens element 7 at the optical axis (I);

G34 represents the distance between the image-side surface 52 of the third lens element 5 and the object-side surface 61 of the fourth lens element 6 at the optical axis (I);

CTmin represents a minimum among the distance between the object-side surface 31 and the image-side surface 32 of the first lens element 3 at the optical axis (I), the distance between the object-side surface 41 and the image-side surface 42 of the second lens element 4 at the optical axis (I), the distance between the object-side surface 51 and the image-side surface 52 of the third lens element 5 at the optical axis (I), the distance between the object-side surface 61 and the image-side surface 62 of the fourth lens element 6 at the optical axis (I), and the distance between the object-side surface 71 and the image-side surface 72 of the fifth lens element 7 at the optical axis (I); and EFL represents an effective focal length of the imaging lens.

FIGS. 5(a) to 5(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 555 nm, and 650 nm are shown.

Figure 5:
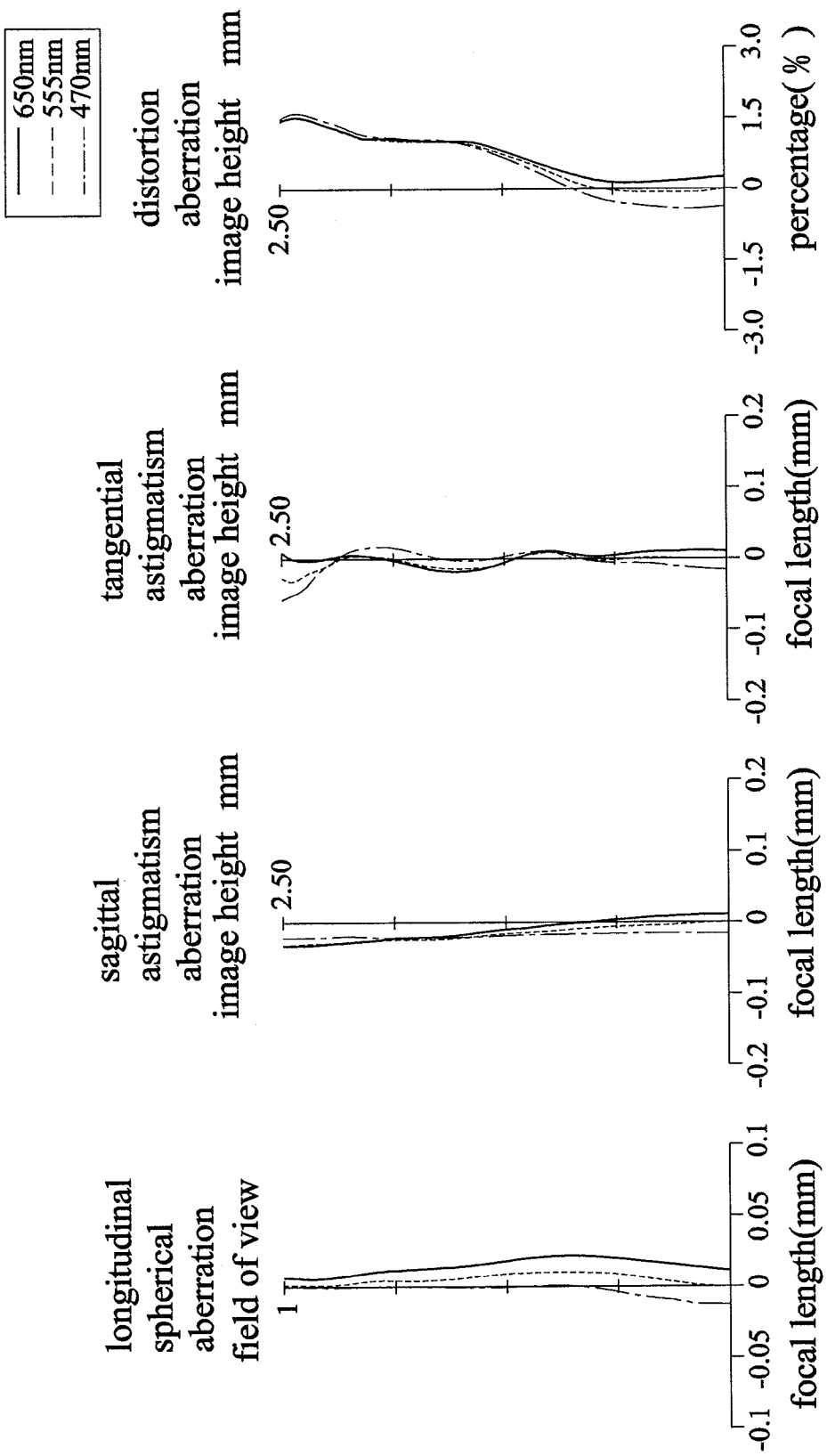
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.025 mm, the first preferred embodiment is able to achieve a relatively low spherical aberration at each of the wavelengths. Furthermore, since a deviation in focal length among the curves at each field of view does not exceed the range of ±0.025 mm, the first preferred embodiment has a relatively low chromatic aberration.

It can be understood from FIGS. 5(b) and 5(c) that, since each of the curves falls within the range of ±0.075 mm of focal length, the first preferred embodiment has a relatively low optical aberration.

Moreover, as shown in FIG. 5(d), since each of the curves corresponding to distortion aberration falls within the range of ±1.7%, the first preferred embodiment is able to meet requirements in imaging quality of most optical systems.

In view of the above, even with the system length reduced down to below 3.97 mm, the imaging lens 10 of the first preferred embodiment is still able to achieve a relatively good optical performance.

Figure 6:
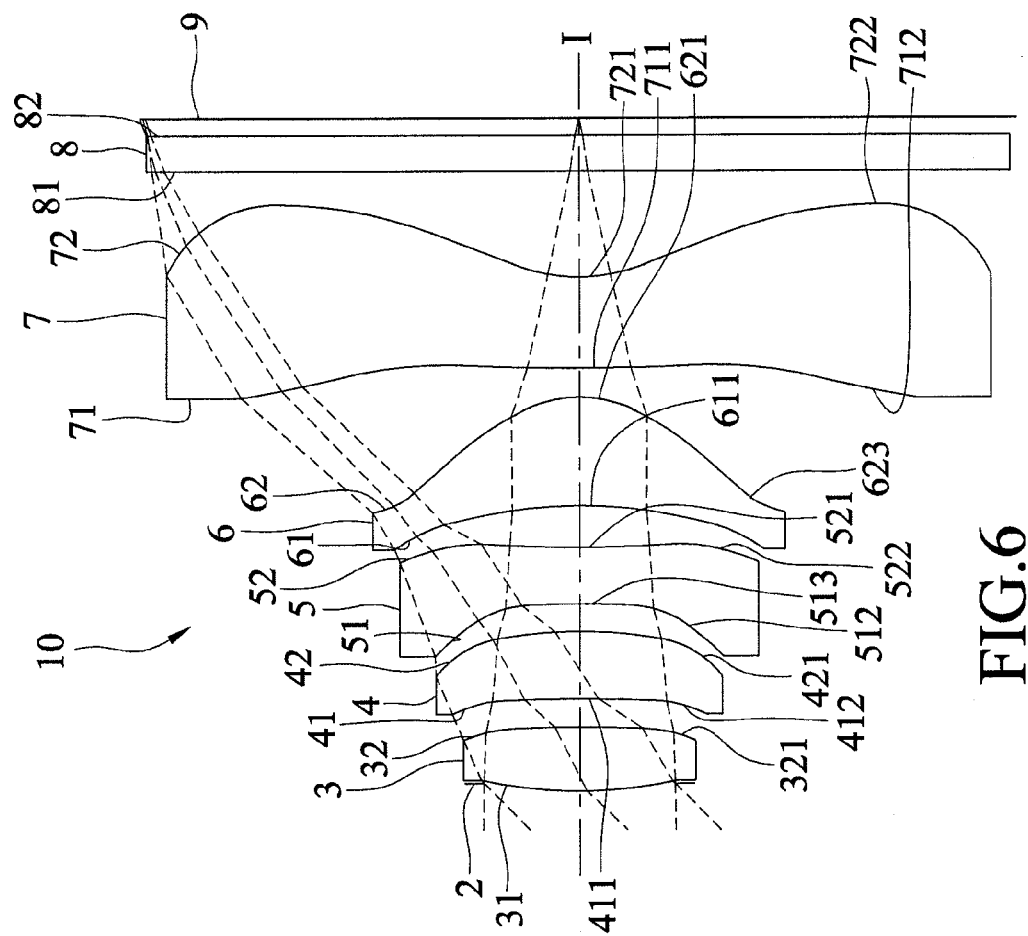
FIG. 6 is a schematic diagram that illustrates the second preferred embodiment of an imaging lens according to the present invention.
Figure 9:
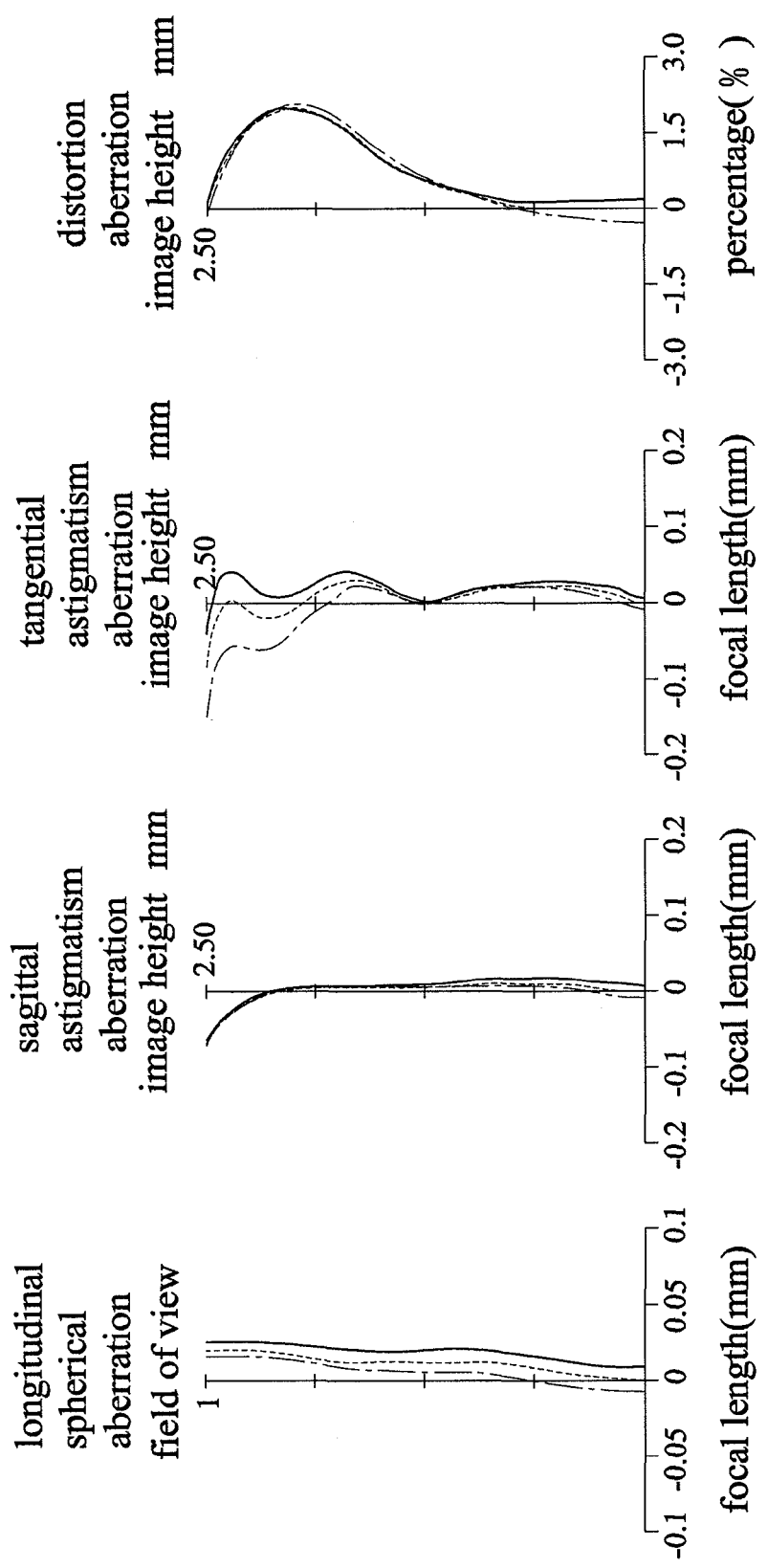
FIGS. 9(a) to 9(d) show different optical characteristics of the imaging lens of the second preferred embodiment.

Referring to FIG. 6, the differences between the first and second preferred embodiments of the imaging lens 10 of this invention reside in that:

The object-side surface 51 of the third lens element 5 is a concave surface that has a concave portion 513 in a vicinity of the optical axis (I), and a concave portion 512 in a vicinity of a periphery of the third lens element 5. The image-side surface 62 of the fourth lens element 6 is a convex surface that has a convex portion 621 in a vicinity of the optical axis (I), and a convex portion 623 in a vicinity of a periphery of the fourth lens element 6.

Shown in FIG. 7 is a table that lists values of some optical parameters corresponding to the surfaces 31-81, 32-82 of the second preferred embodiment. The imaging lens 10 has an overall system focal length of 2.50 mm, an HFOV of 44.86°, an F-number of 2.45, and a system length of 3.84 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are as follows:

$Gaa/G34=3.06$ $EFL/T2=6.44$

EFL/G34=10.71

Gaa/T5=1.35

Gaa/CTmin=2.22

ALT/Gaa=3.11

Gaa/T2=1.84

FIGS. 9(a) to 9(d) show simulation results corresponding to longitudinal spherical aberration, sagittal astigmatism aberration, tangential astigmatism aberration, and distortion aberration of the second preferred embodiment, respectively. It can be understood from FIGS. 9(a), 9(b), 9(c) and 9(d) that the second preferred embodiment is able to achieve a relatively good optical performance even with the system length reduced down to 3.84 mm.

Figure 10:
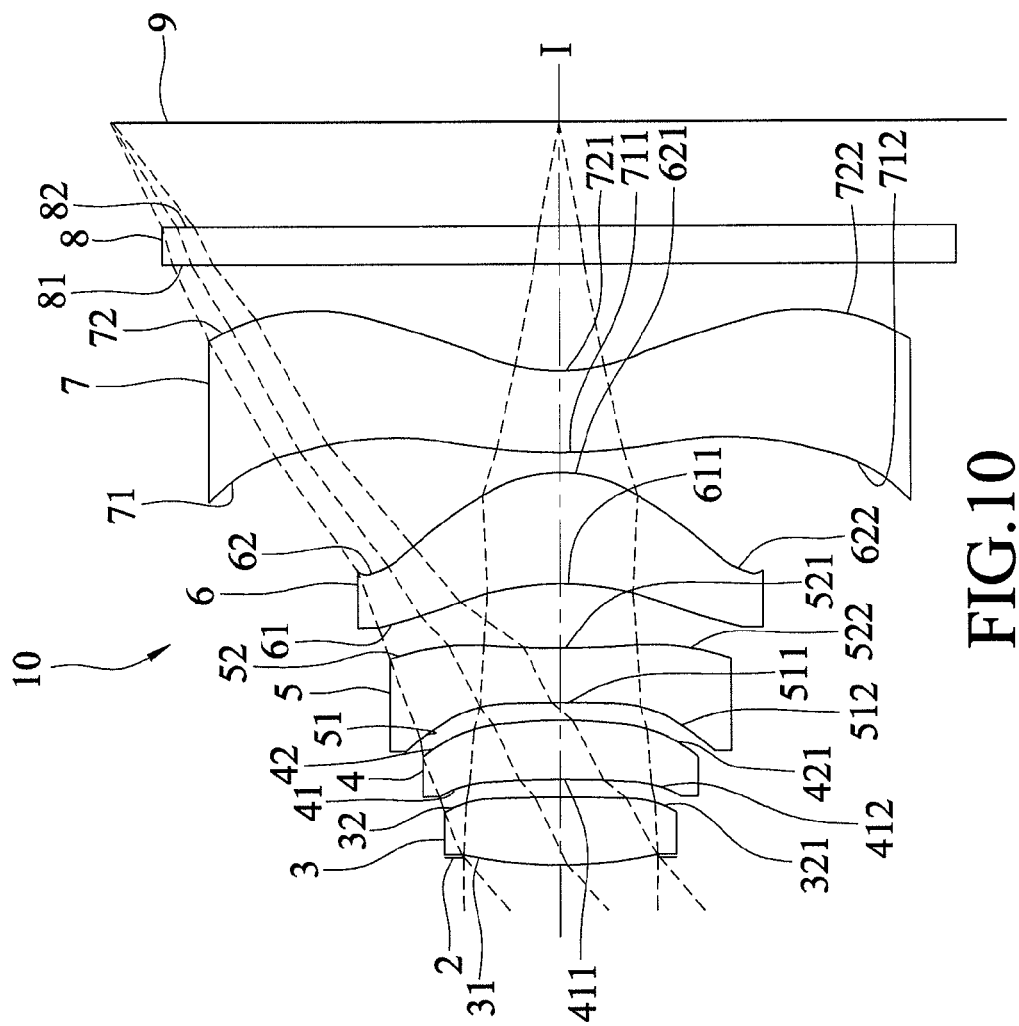
FIG. 10 is a schematic diagram that illustrates the third preferred embodiment of an imaging lens according to the present invention.
Figure 13:
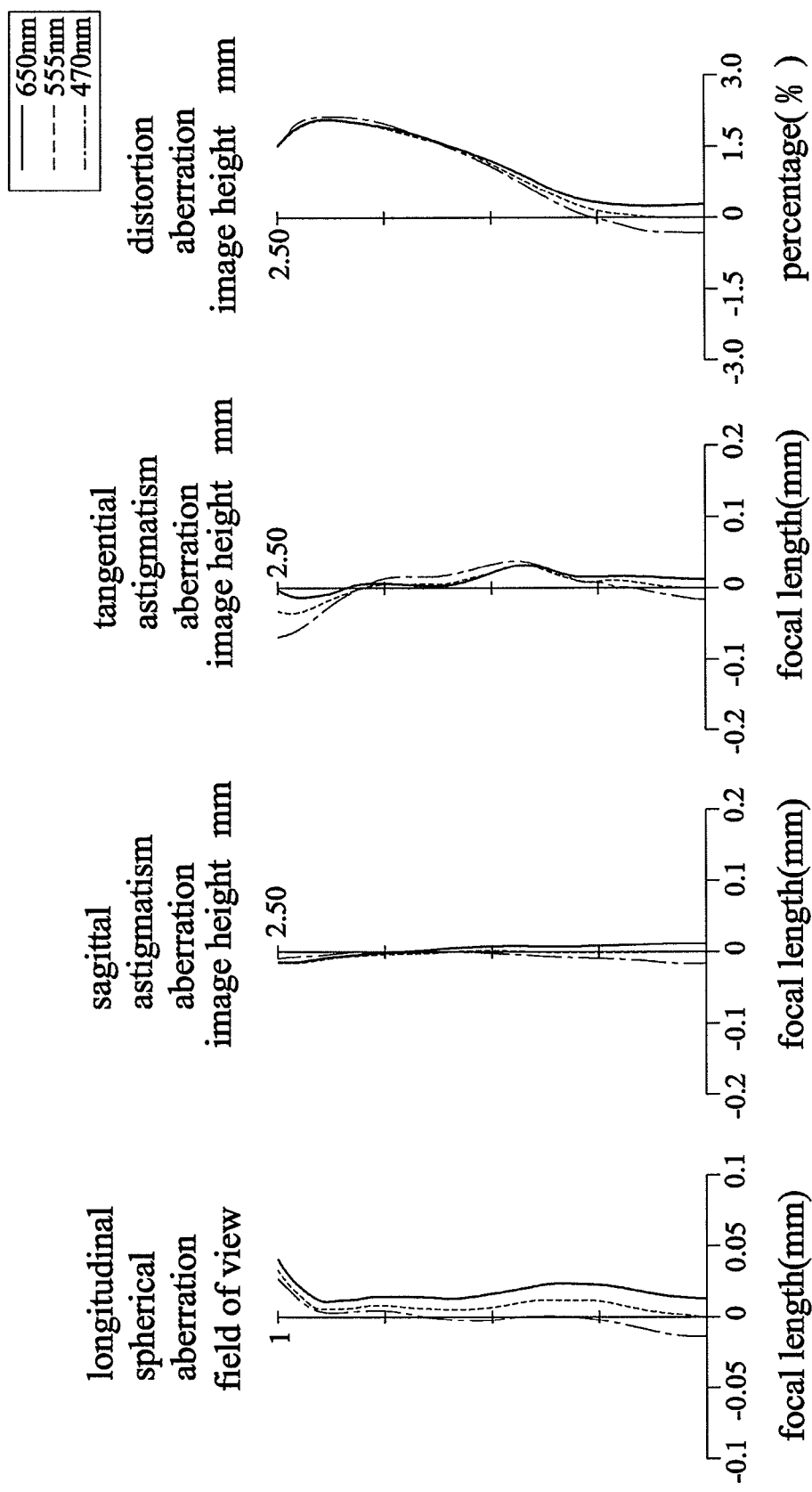
FIGS. 13(a) to 13(d) show different optical characteristics of the imaging lens of the third preferred embodiment.

FIG. 10 illustrates the third preferred embodiment of an imaging lens 10 according to the present invention, which has a configuration similar to that of the first preferred embodiment.

Shown in FIG. 11 is a table that lists values of some optical parameters corresponding to the surfaces 31-81, 32-82 of the third preferred embodiment. The imaging lens 10 has an overall system focal length of 2.85 mm, an HFOV of 40.74°, an F-number of 2.45, and a system length of 4.16 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are as follows:

Gaa/G34=1.88

EFL/T2=8.52

EFL/G34=8.03

Gaa/T5=1.48

Gaa/CTmin=2.18

ALT/Gaa=3.14

Gaa/T2=1.99

FIGS. 13(a) to 13(d) show simulation results corresponding to longitudinal spherical aberration, sagittal astigmatism aberration, tangential astigmatism aberration, and distortion aberration of the third preferred embodiment, respectively. It can be understood from FIGS. 13(a), 13(b), 13(c) and 13(d) that the third preferred embodiment is likewise able to achieve a relatively good optical performance even with the system length reduced down to 4.16 mm.

Figure 14:
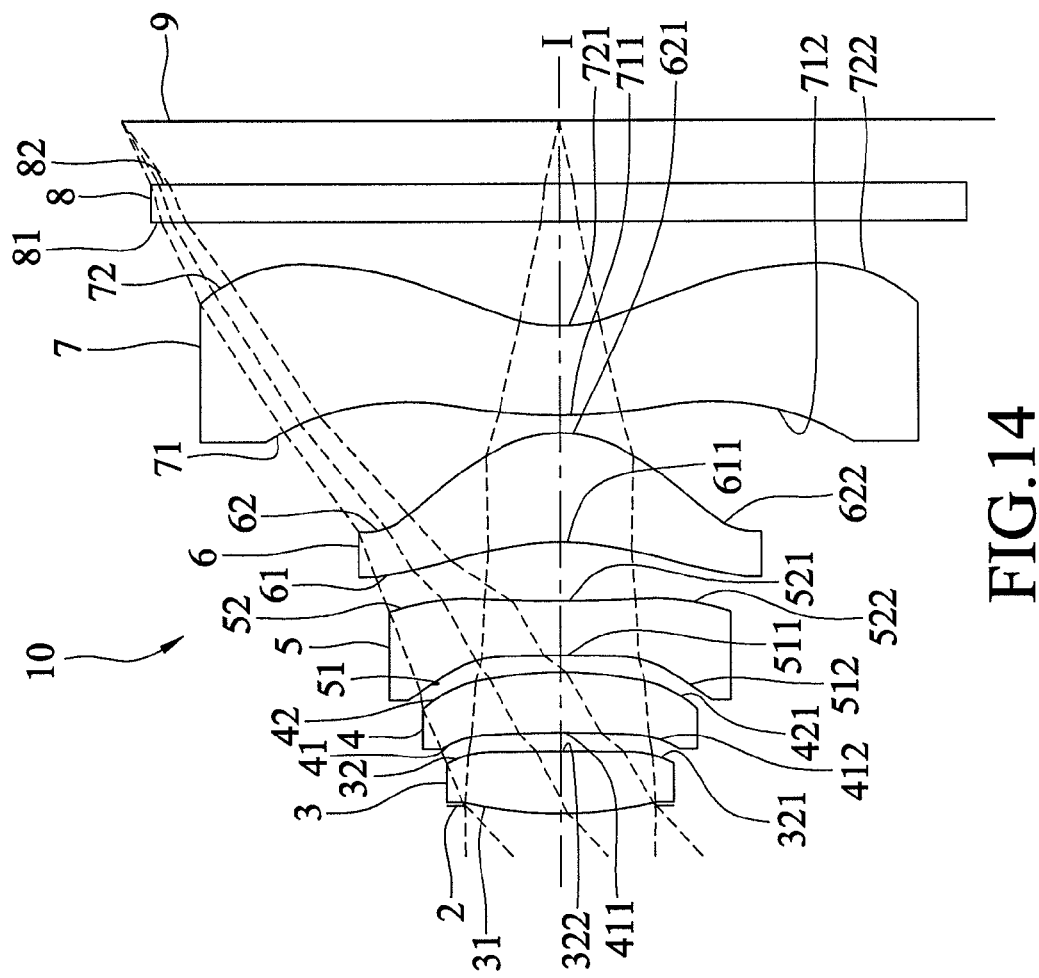
FIG. 14 is a schematic diagram that illustrates the fourth preferred embodiment of an imaging lens according to the present invention.
Figures 17A, 17B, 17C, 17D:
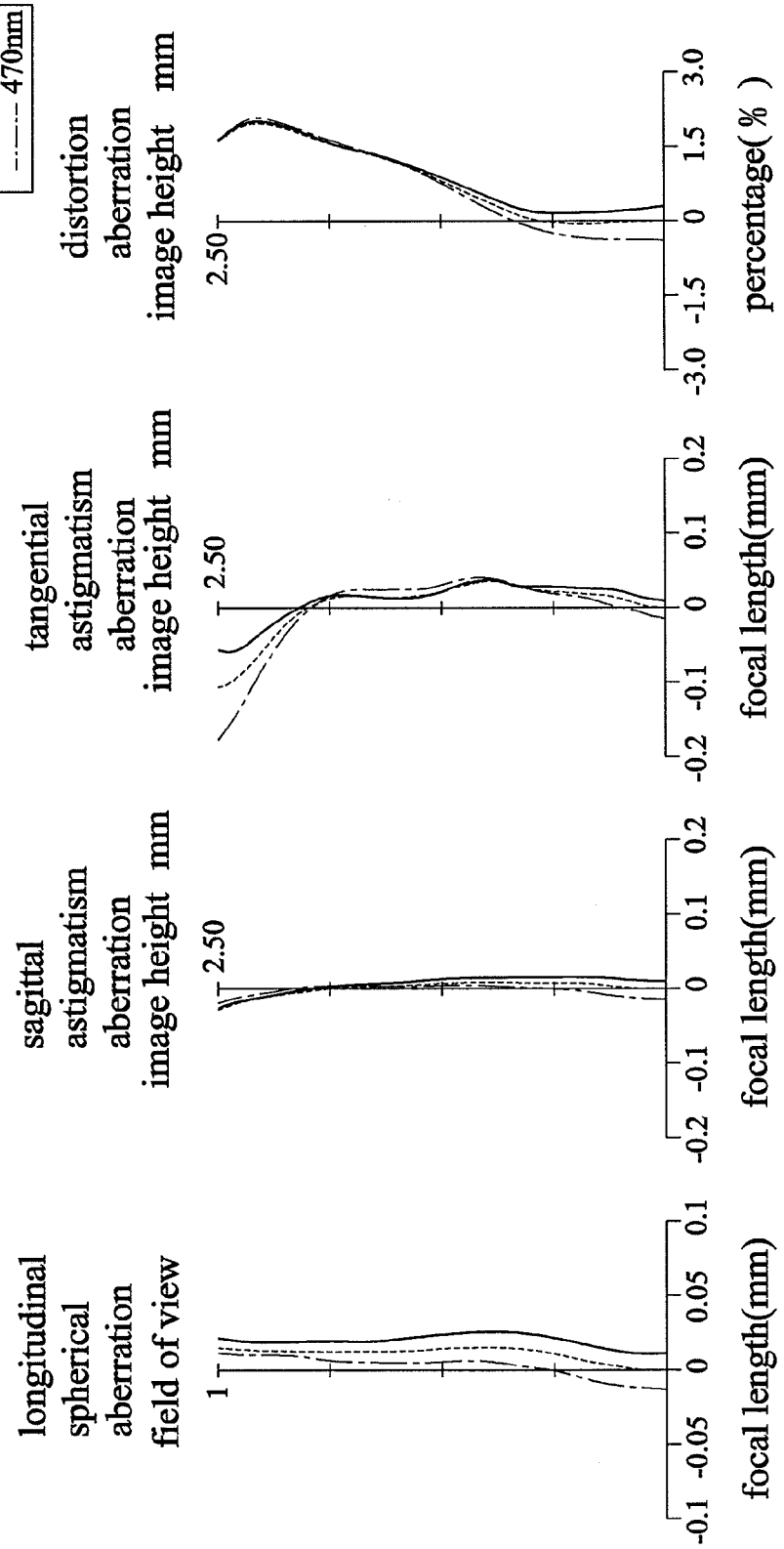
FIGS. 17(a) to 17(d) show different optical characteristics of the imaging lens of the fourth preferred embodiment.

Referring to FIG. 14, the differences between the first and fourth preferred embodiments of the imaging lens 10 of this invention reside in that:

The image-side surface 32 of the first lens element 3 has a concave portion 322 in a vicinity of the optical axis (I), and a convex portion 321 in a vicinity of a periphery of the first lens element 3.

Shown in FIG. 15 is a table that lists values of some optical parameters corresponding to the surfaces. 31-81, 32-82 of the fourth preferred embodiment. The imaging lens 10 has an overall system focal length of 2.60 mm, an HFOV of 43.28°, an F-number of 2.45, and a system length of 3.97 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are as follows:

Gaa/G34=1.86

EFL/T2=7.43

EFL/G34=7.43

Gaa/T5=1.26

Gaa/CTmin=2.17

ALT/Gaa=3.30

Gaa/T2=1.86

FIGS. 17(a) to 17(d) show simulation results corresponding to longitudinal spherical aberration, sagittal astigmatism aberration, tangential astigmatism aberration, and distortion aberration of the fourth preferred embodiment, respectively. It can be understood from FIGS. 17 (a), 17 (b), 17 (c) and 17 (d) that the fourth preferred embodiment is likewise able to achieve a relatively good optical performance even with the system length reduced down to 3.97 mm.

Figure 18:
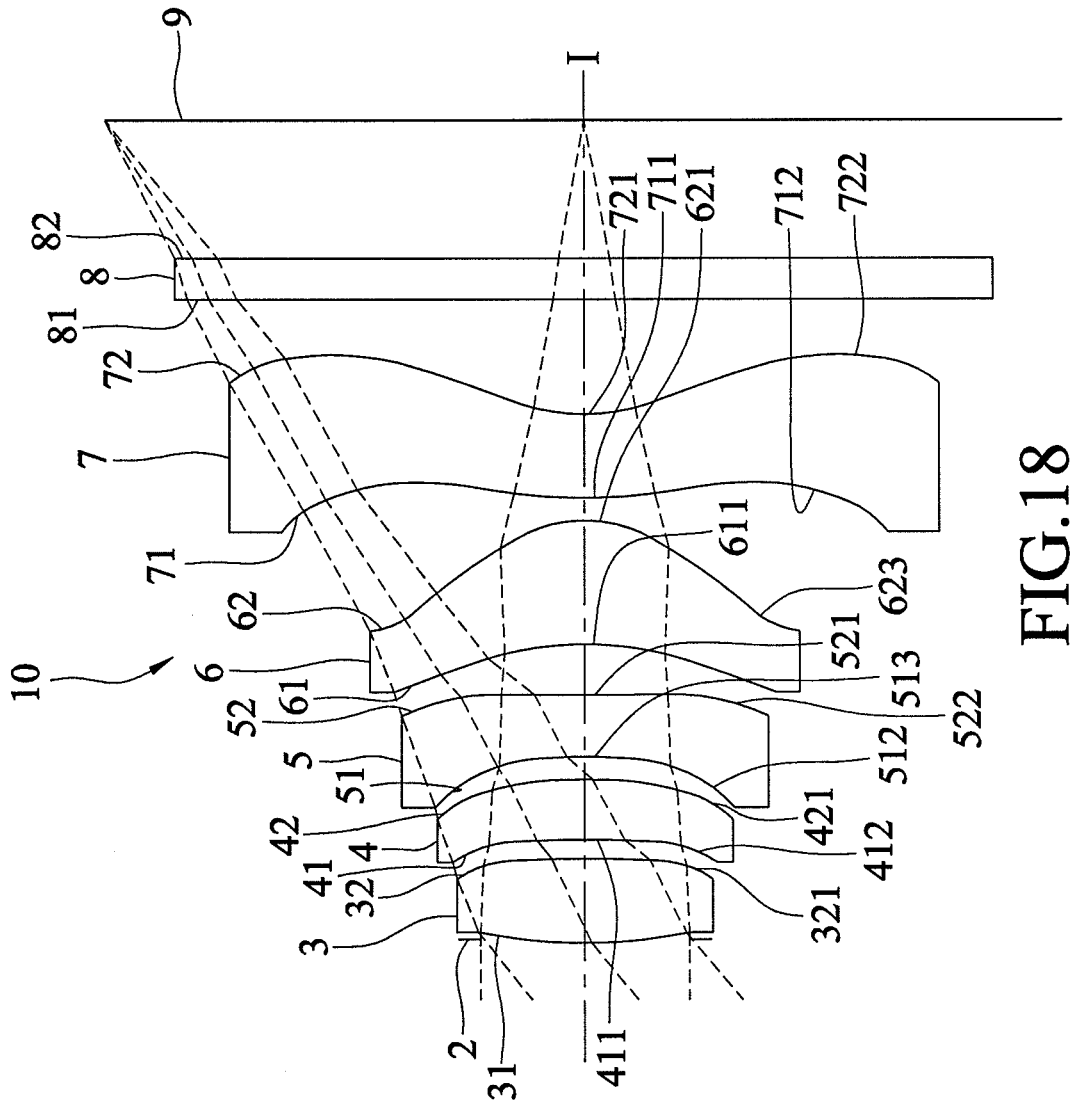
FIG. 18 is a schematic diagram that illustrates the fifth preferred embodiment of an imaging lens according to the present invention.
Figure 21:
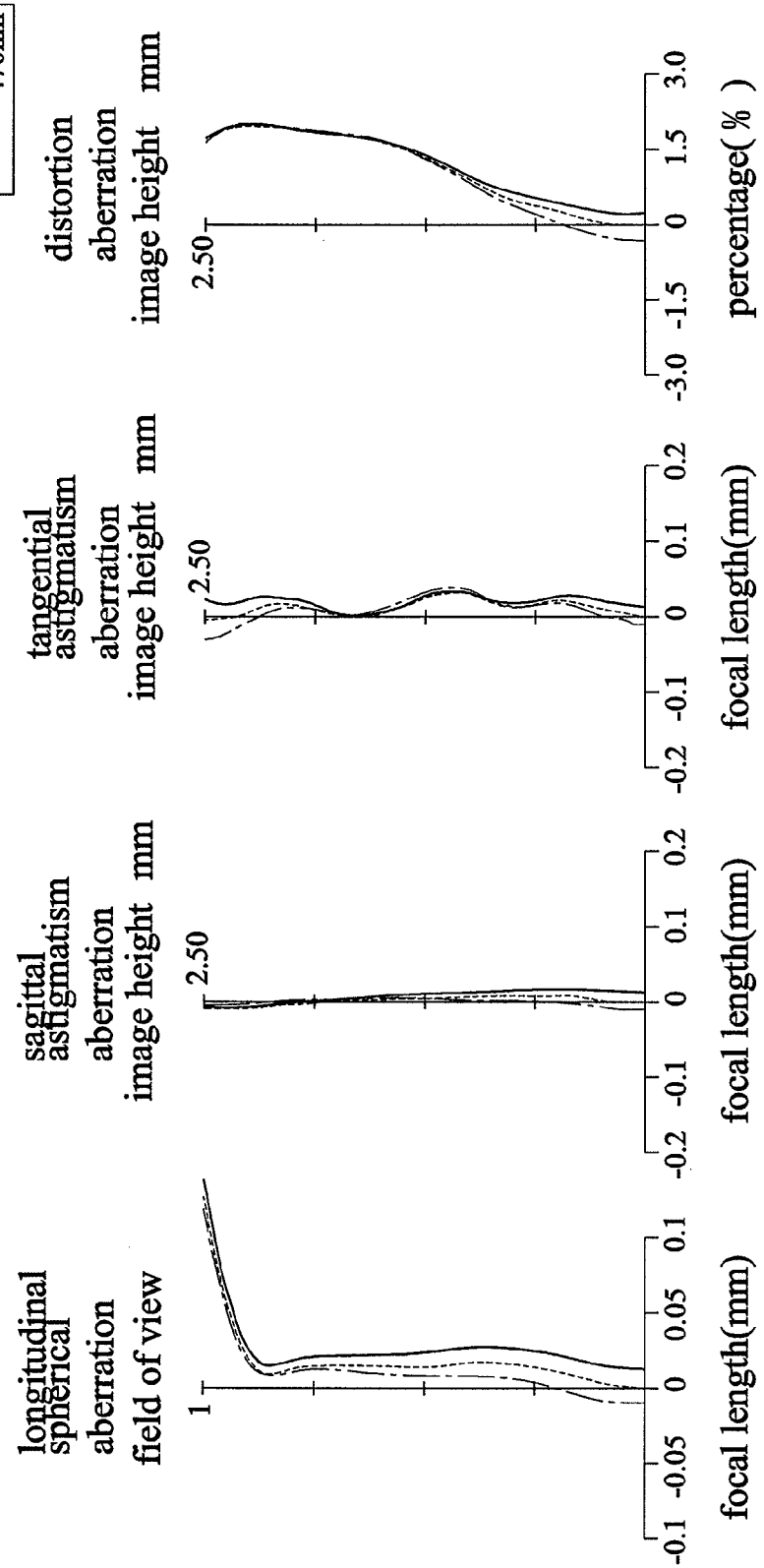
FIGS. 21(a) to 21(d) show different optical characteristics of the imaging lens of the fifth preferred embodiment.

Referring to FIG. 18, the differences between the first and fifth preferred embodiments of the imaging lens 10 of this invention reside in that:

The object-side surface 51 of the third lens element 5 is a concave surface that has a concave portion 513 in a vicinity of the optical axis (I), and a concave portion 512 in a vicinity of a periphery of the third lens element 5. The image-side surface 62 of the fourth lens element 6 is a convex surface that has a convex portion 621 in a vicinity of the optical axis (I), and a convex portion 623 in a vicinity of a periphery of the fourth lens element 6.

Shown in FIG. 19 is a table that lists values of some optical parameters corresponding to the surfaces 31-81, 32-82 of the fifth preferred embodiment. The imaging lens 10 has an overall system focal length of 2.95 mm, an HFOV of 39.67°, an F-number of 2.45, and a system length of 4.28 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are as follows:

Gaa/G34=2.26

EFL/T2=9.56

EFL/G34=10.93

Gaa/T5=1.43

Gaa/CTmin=1.98

ALT/Gaa=3.49

Gaa/T2=1.98

FIGS. 21(a) to 21(d) show simulation results corresponding to longitudinal spherical aberration, sagittal astigmatism aberration, tangential astigmatism aberration, and distortion aberration of the fifth preferred embodiment, respectively. It can be understood from FIGS. 21(a), 21 (b), 21 (c) and 21(d)

that the fifth preferred embodiment is likewise able to achieve a relatively good optical performance even with the system length reduced down to 4.28 mm.

Shown in FIG. 22 is a table that lists the aforesaid relationships among some of the aforementioned optical parameters corresponding to the five preferred embodiments for comparison. When each of the optical parameters of the imaging lens 10 according to this invention satisfies the following optical relationships, the optical performance is still relatively good even with the reduced system length:

$$Gaa/G34 \leq 4.0 \quad (2)$$

$$EFL/T2 \leq 9.7 \quad (3)$$

$$Gaa/T2 \leq 2.0 \quad (4)$$

$$Gaa/T5 \leq 2.1 \quad (5)$$

$$Gaa/CTmin \leq 2.5 \quad (6)$$

$$EFL/G34 \leq 11 \quad (7)$$

$$3.1 \leq ALT/Gaa \quad (8)$$

Gaa may be reduced for reduction of the dimension of the imaging lens 10. However, since the object-side surface 61 of the fourth lens element 6 has the concave portion 611 in a vicinity of the optical axis (1), reduction of G34 is limited. Therefore, Gaa/G34 is preferred to satisfy the relationship (2). The relationship (2) may have a lower limit: $1 \leq Gaa/G34 \leq 4$. Preferably, $Gaa/G34 \leq 2$ because greater G34 makes assembly easier.

EFL may be reduced for reduction of the dimension of the imaging lens 10 but the second lens element 4 usually already has a very small thickness, which limits further reduction thereof due to the difficulty in manufacturing. Satisfying the relationship (3) may result in a better arrangement. The relationship (3) may have a lower limit: $6 \leq EFL/T2 \leq 9.7$. Preferably, $7 \leq EFL/T2 \leq 9.7$.

Gaa may be reduced for reduction of the dimension of the imaging lens 10, but the second lens element 4 usually already has a very small thickness, which limits further reduction of T2 due to the difficulty in manufacturing. Satisfying the relationship (4) may result in a better arrangement. The relationship (4) may have a lower limit: $1 \leq Gaa/T2 \leq 2$.

Gaa may be reduced for reduction of the dimension of the imaging lens 10. In addition, since the fifth lens element 7 has a relatively large optical effective radius, T5 should not be too small. Satisfying the relationship (5) may result in a better arrangement. The relationship (5) may have a lower limit: $1 \leq Gaa/T5 \leq 2.1$.

Gaa may be reduced for reduction of the dimension of the imaging lens 10. However, reductions of thicknesses of the lens elements may be limited due to difficulty in manufacturing, especially for the lens element that has the smallest thickness (CTmin). Satisfying the relationship (6) may result in a better arrangement. The relationship (6) may have a lower limit: $1.5 \leq Gaa/CTmin \leq 2.5$.

EFL may be reduced for reduction of the dimension of the imaging lens 10. However, since the object-side surface 61 of the fourth lens element 6 has the concave portion 611 in a vicinity of the optical axis (I), reduction of G34 is limited. Therefore, EFL/G34 is preferred to satisfy the relationship (7). The relationship (7) may have a lower limit: $6 \leq EFL/G34 \leq 11$. Preferably, $EFL/G34 \leq 7.5$.

Gaa and ALT may be reduced for reduction of the dimension of the imaging lens 10. Considering difficulty in manufacturing, satisfying the relationship (8) may result in a better arrangement. The relationship (8) may have an upper limit: $3.1 \leq ALT/Gaa \leq 4.2$.

To sum up, effects and advantages of the imaging lens 10 according to the present invention are described hereinafter.

1. The convex portion 321 of the image-side surface 32 of the first lens element 3 may enhance converging capability of the imaging lens 10.

2. By virtue of the concave portion 412, the convex portion 421, and the concave portion 512, optical aberration at edges of the image may be corrected.

3. By virtue of the positive refractive power of the fourth lens element 6, refractive power of the imaging lens 10 may be distributed, and the concave portion 611 of the object-side surface 61 of the fourth lens element 6 may correct image aberration.

4. Since the fifth lens element 7 is made of a plastic material, the weight and the manufacturing cost of the imaging lens 10 may be reduced.

5. Through design of the relevant optical parameters, such as Gaa/G34, EFL/T2, Gaa/T2, Gaa/T5, Gaa/CTmin, EFL/G34, and ALT/Gaa, optical aberrations, such as spherical aberration, may be reduced or even eliminated. Further, through surface design and arrangement of the lens elements 3-7, even when the system length is reduced, optical aberrations may still be reduced or eliminated, resulting in relatively good optical performance.

6. Through the aforesaid five preferred embodiments, it is apparent that the system length of this invention may be reduced down to below 5 mm, so as to facilitate developing thinner relevant products with economic benefits.

Figure 23:
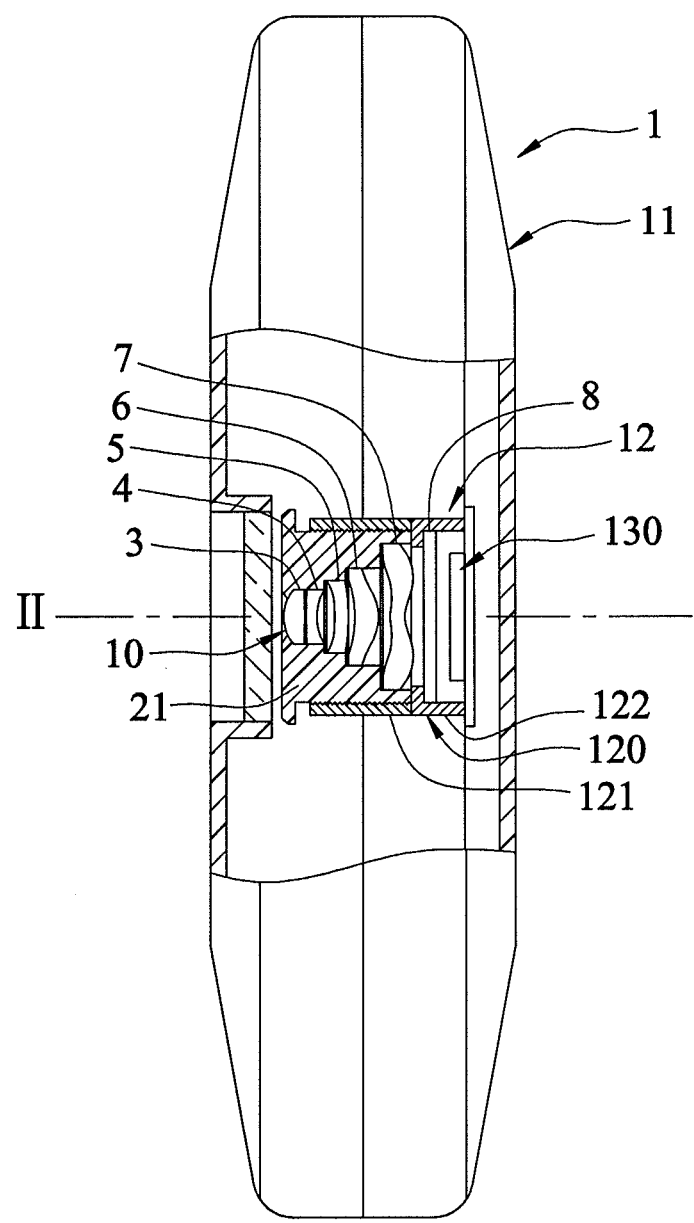
FIG. 23 is a schematic partly sectional view to illustrate a first exemplary application of the imaging lens of the present invention.

Shown, in FIG. 23 is a first exemplary application of the imaging lens 10, in which the imaging lens 10 is disposed in a housing 11 of an electronic apparatus 1, and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 9 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 24:
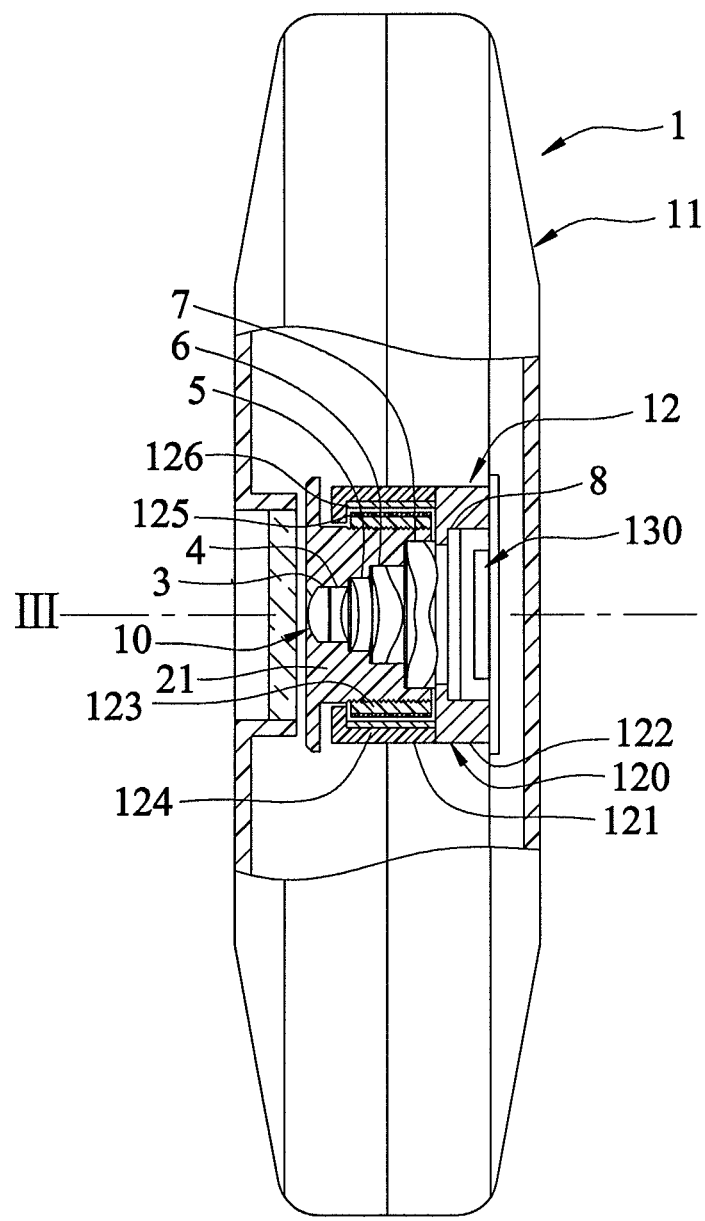
FIG. 24 is a schematic partly sectional view to illustrate a second exemplary application of the imaging lens of the present invention.

Shown in FIG. 24 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 8 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising first, second, third, fourth and fifth lens elements arranged from an object side to an image side in the given order along an optical axis of said imaging lens, each of said first, second, third, fourth and fifth lens elements having an object-side surface facing toward the object side and an image-side surface facing toward the image side, wherein:
   said image-side surface of said first lens element has a convex portion in a vicinity of a periphery of said first lens element;
   said object-side surface of said second lens element has a concave portion in a vicinity of a periphery of said second lens element, said image-side surface of said second lens element having a convex portion in a vicinity of said periphery of said second lens element;
   said object-side surface of said third lens element has a concave portion in a vicinity of a periphery of said third lens element;
   said fourth lens element has a positive refractive power, said object-side surface of said fourth lens element having a concave portion in a vicinity of the optical axis;
   said fifth lens element is made of a plastic material; and
   said imaging lens satisfies $EFL/T2 \leq 9.7$, where EFL represents an effective focal length of said imaging lens, and T2 represents a distance between said object-side surface and said image-side surface of said second lens element at the optical axis.

2. The imaging lens as claimed in claim 1, further satisfying $Gaa/G34 \leq 4$, where Gaa represents a sum of a distance between said image-side surface of said first lens element and said object-side surface of said second lens element at the optical axis, a distance between said image-side surface of said second lens element and said object-side surface of said third lens element at the optical axis, a distance between said image-side surface of said third lens element and said object-side surface of said fourth lens element at the optical axis, and a distance between said image-side surface of said fourth lens element and said object-side surface of said fifth lens element at the optical axis; and G34 represents the distance between said image-side surface of said third lens element and said object-side surface of said fourth lens element at the optical axis.

3. The imaging lens as claimed in claim 2, further satisfying $Gaa/T2 \leq 2.0$.

4. The imaging lens as claimed in claim 3, wherein said object-side surface of said second lens element further has a concave portion in a vicinity of the optical axis.

5. The imaging lens as claimed in claim 2, further satisfying $Gaa/T5 \leq 2.1$, where T5 represents a distance between said object-side surface and said image-side surface of said fifth lens element at the optical axis.

6. The imaging lens as claimed in claim 5, further satisfying $Gaa/G34 \leq 2$.

7. The imaging lens as claimed in claim 1, further satisfying $Gaa/CTmin \leq 2.5$, where Gaa represents a sum of a distance between said image-side surface of said first lens element and said object-side surface of said second lens element at the optical axis, a distance between said image-side surface of said second lens element and said object-side surface of said third lens element at the optical axis, a distance between said image-side surface of said third lens element and said object-side surface of said fourth lens element at the optical axis, and a distance between said image-side surface of said fourth lens element and said object-side surface of said fifth lens element at the optical axis; and
   CTmin represents a minimum among a distance between said object-side surface and said image-side surface of said first lens element at the optical axis, the distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, and a distance between said object-side surface and said image-side surface of said fifth lens element at the optical axis.

8. The imaging lens as claimed in claim 7, further satisfying $EFL/G34 \leq 7.5$, where G34 represents the distance between said image-side surface of said third lens element and said object-side surface of said fourth lens element at the optical axis.

9. The imaging lens as claimed in claim 1, further satisfying $EFL/G34 \leq 11$, where EFL represents an effective focal length of said imaging lens, and G34 represents a distance between said image-side surface of said third lens element and said object-side surface of said fourth lens element at the optical axis.

10. The imaging lens as claimed in claim 9, further satisfying $3.1 \leq ALT/Gaa$, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, and a distance between said object-side surface and said image-side surface of said fifth lens element at the optical axis; and
   Gaa represents a sum of a distance between said image-side surface of said first lens element and said object-side surface of said second lens element at the optical axis, a distance between said image-side surface of said second lens element and said object-side surface of said third lens element at the optical axis, the distance between said image-side surface of said third lens element and said object-side surface of said fourth lens element at the optical axis, and a distance between said image-side surface of said fourth lens element and said object-side surface of said fifth lens element at the optical axis.

11. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *